United States Patent
Karsenti et al.

(10) Patent No.: US 10,402,461 B2
(45) Date of Patent: Sep. 3, 2019

(54) VIRTUAL INSPECTION SYSTEMS FOR PROCESS WINDOW CHARACTERIZATION

(71) Applicant: KLA-Tencor Corporation, Milpitas, CA (US)

(72) Inventors: Laurent Karsenti, Rehovot (IL); Kris Bhaskar, San Jose, CA (US); Mark Wagner, Rehovot (IL); Brian Duffy, San Jose, CA (US); Vijayakumar Ramachandran, Sunnyvale, CA (US)

(73) Assignee: KLA-Tencor Corp., Milpitas, CA (US)

( * ) Notice: Subject to any disclaimer, the term of this patent is extended or adjusted under 35 U.S.C. 154(b) by 225 days.

(21) Appl. No.: 14/946,777

(22) Filed: Nov. 20, 2015

(65) Prior Publication Data

US 2016/0150191 A1    May 26, 2016

Related U.S. Application Data

(60) Provisional application No. 62/083,120, filed on Nov. 21, 2014.

(51) Int. Cl.
| | |
|---|---|
| *G06T 1/00* | (2006.01) |
| *G06T 7/00* | (2017.01) |
| *H04N 7/18* | (2006.01) |
| *H04L 29/08* | (2006.01) |
| *G06F 16/9535* | (2019.01) |

(52) U.S. Cl.
CPC ........ *G06F 16/9535* (2019.01); *G06T 1/0007* (2013.01); *G06T 7/0006* (2013.01);
(Continued)

(58) Field of Classification Search
CPC .................. G06T 7/001; G06T 7/0006; G06T 2207/30148; G06T 2207/10144;
(Continued)

(56) References Cited

U.S. PATENT DOCUMENTS

| 6,452,677 B1 | 9/2002 | Do et al. |
| 7,570,796 B2 | 8/2009 | Lafar et al. |

(Continued)

OTHER PUBLICATIONS

International Search Report for PCT/US2015/062104 dated Mar. 30, 2016.

*Primary Examiner* — Geoffrey E Summers
(74) *Attorney, Agent, or Firm* — Ann Marie Mewherter

(57) ABSTRACT

Methods and systems for detecting defects on a specimen are provided. One system includes a storage medium configured for storing images for a physical version of a specimen generated by an inspection system. At least two dies are formed on the specimen with different values of one or more parameters of a fabrication process performed on the specimen. The system also includes computer subsystem(s) configured for comparing portions of the stored images generated at locations on the specimen at which patterns having the same as-designed characteristics are formed with at least two of the different values. The portions of the stored images that are compared are not constrained by locations of the dies on the specimen, locations of the patterns within the dies, or locations of the patterns on the specimen. The computer subsystem(s) are also configured for detecting defects at the locations based on results of the comparing.

27 Claims, 5 Drawing Sheets

(52) U.S. Cl.
CPC ........... *H04L 67/306* (2013.01); *H04N 7/181* (2013.01); *G06T 2207/10144* (2013.01); *G06T 2207/30148* (2013.01)

(58) Field of Classification Search
CPC ............. G06T 1/0007; G06F 17/30867; G06F 16/9535; H04L 67/306; H04L 65/403; H04N 7/181
USPC ........................................ 382/144, 145, 149
See application file for complete search history.

(56) References Cited

U.S. PATENT DOCUMENTS

| | | | |
|---|---|---|---|
| 7,676,077 B2 | 3/2010 | Kulkarni et al. | |
| 8,041,103 B2 | 10/2011 | Kulkarni et al. | |
| 8,126,255 B2 | 2/2012 | Bhaskar et al. | |
| 8,139,843 B2 | 3/2012 | Kulkarni et al. | |
| 8,664,594 B1 | 4/2014 | Jiang et al. | |
| 8,692,204 B2 | 4/2014 | Kojima et al. | |
| 8,698,093 B1 | 4/2014 | Gubbens et al. | |
| 8,716,662 B1 | 5/2014 | MacDonald et al. | |
| 8,923,600 B2 | 12/2014 | Zafar et al. | |
| 2006/0291714 A1* | 12/2006 | Wu .................. | G01N 21/95607 382/149 |
| 2007/0288219 A1* | 12/2007 | Zafar ....................... | G03F 1/84 703/14 |
| 2008/0056559 A1 | 3/2008 | Hiroi et al. | |
| 2009/0080759 A1 | 3/2009 | Bhaskar et al. | |
| 2009/0290784 A1 | 11/2009 | Lin et al. | |
| 2011/0276935 A1 | 11/2011 | Fouquet et al. | |
| 2014/0241610 A1 | 8/2014 | Duffy et al. | |
| 2015/0154746 A1 | 6/2015 | Zafar et al. | |

* cited by examiner

VIRTUAL INSPECTION SYSTEMS FOR PROCESS WINDOW CHARACTERIZATION

BACKGROUND OF THE INVENTION

1. Field of the Invention

The present invention generally relates to methods and systems for automated process window characterization and systematic defect detection leveraging persistent wafer imaging.

2. Description of the Related Art

The following description and examples are not admitted to be prior art by virtue of their inclusion in this section.

Inspection processes are used at various steps during a semiconductor manufacturing process to detect defects on wafers to promote higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

Process window qualification (PWQ) is a type of inspection performed on a specimen fabricated in a particular way that is essential to check if a specific chip design can be manufactured (free of critical hot spots) and to decide about the optimal parameters for a lithography process (e.g., focus/exposure). In currently used methods, the lithography qualification procedure can be a very time consuming and manual procedure. Usually, a focus-exposure modulated wafer is printed to simulate different process window conditions. The wafer is then inspected using a relatively sensitive bright field (BF) inspection tool. The detected defects are divided into bins by a design-based algorithm that classifies the defects by type of printing error (a unique design structure is associated with each bin). To determine how a printing error is affecting the chip yield at different process modulations, a defect sampling strategy followed by scanning electron microscope (SEM) review is performed. For example, a few representative defects from each bin can be visited at different die modulations. This time consuming procedure checks how a structure responds to changes in lithography parameters (focus/exposure) and finally the process window limits are determined. To increase sensitivity, a second iteration is sometimes performed. In that case, the previously identified printing errors can be used as care areas in the wafer inspection. The complete procedure may then be repeated.

There are, however, several disadvantages to currently used methods for PWQ. For example, the currently used methods can be substantially time consuming (several days) and can require engineering expertise and tool time availability (optical inspector and/or SEM review). The tuning of the inspection tool on a modulated wafer involves a lot of trial and error tests to work within the defect count capacity of the optical inspector. The goal is to detect any potential hot spots by exaggerating their formation mechanism (e.g., defocusing) but at the same time the detection system should not run into defect count saturation. Running the inspection at a sensitivity below the sensitivity capability of the inspection tool can compromise the whole wafer analysis. Another disadvantage of the currently used methods is related to the sampling strategy for SEM review. The assumption is that a systematic printing error is accurately represented by a few selected defects/locations observed using SEM review (representative sampling). If the assumption is invalid, hot spots can be missed or process window can be incorrectly reported. An additional weak point of the currently used methods is that patterns that are intended to be identical on the wafer may not be identical on a mask used to print them. In this case, a die-to-die approach would miss the source of the variation.

Accordingly, it would be advantageous to develop systems and methods for detecting defects on a specimen that do not have one or more of the disadvantages described above.

SUMMARY OF THE INVENTION

The following description of various embodiments is not to be construed in any way as limiting the subject matter of the appended claims.

One embodiment relates to a system configured to detect defects on a specimen. The system includes a storage medium configured for storing images for a specimen generated by an inspection system. The inspection system is configured for scanning energy over a physical version of the specimen while detecting energy from the specimen to thereby generate the images for the specimen. At least two dies are formed on the physical version of the specimen with different values of one or more parameters of a fabrication process performed on the specimen. The system also includes one or more computer subsystems configured for comparing portions of the stored images generated at locations on the specimen at which patterns having the same as-designed characteristics are formed with at least two of the different values. The portions of the stored images that are compared are not constrained by locations of the dies on the specimen, locations of the patterns within the dies, or locations of the patterns on the specimen. The computer subsystem(s) are also configured for detecting defects at the locations based on results of the comparing. The system may be further configured as described herein.

Another embodiment relates to a method for detecting defects on a specimen. The method includes storing images for a specimen generated by an inspection system, which is configured as described above. At least two dies are formed on the physical version of the specimen with different values of one or more parameters of a fabrication process performed on the specimen. The method also includes the comparing and detecting described above. The steps of the method are performed by one or more computer subsystems.

Each of the steps of the method described above may be further performed as described further herein. In addition, the embodiment of the method described above may include any other step(s) of any other method(s) described herein. Furthermore, the method described above may be performed by any of the systems described herein.

Another embodiment relates to a non-transitory computer-readable medium storing program instructions executable on a computer system for performing a computer-implemented method for detecting defects on a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
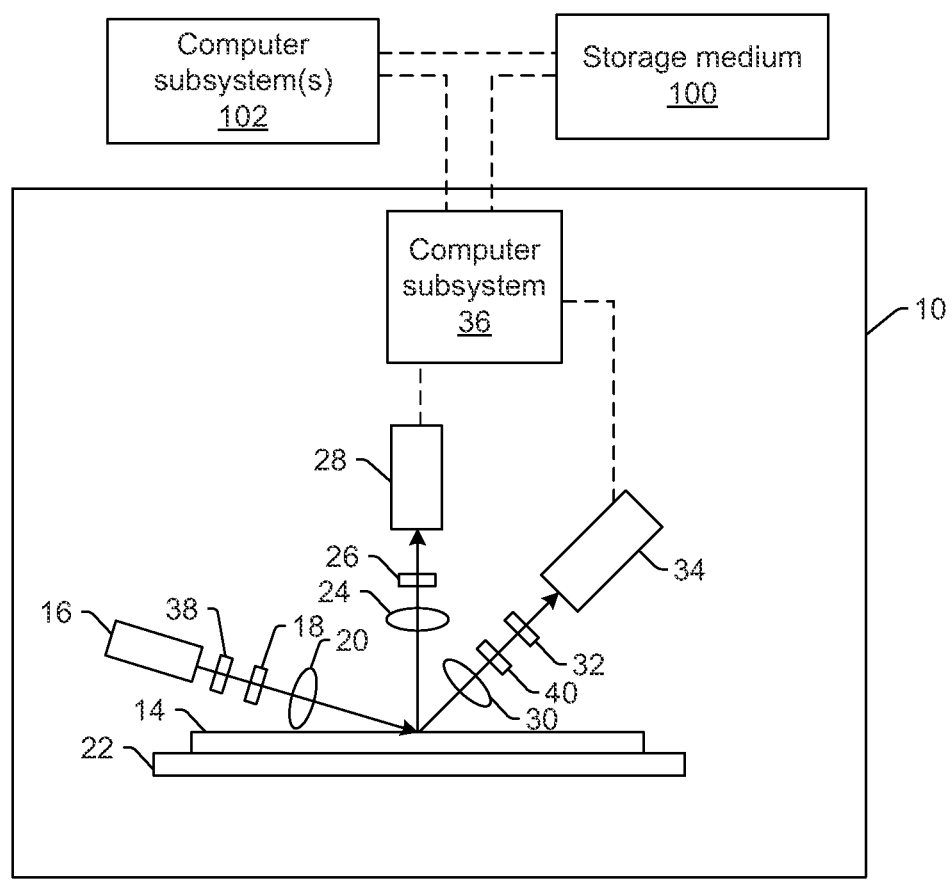
FIGS. 1 and 1a are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The terms "design" and "design data" as used herein generally refer to the physical design (layout) of an IC and data derived from the physical design through complex simulation or simple geometric and Boolean operations. In addition, an image of a reticle acquired by a reticle inspection system and/or derivatives thereof can be used as a "proxy" or "proxies" for the design. Such a reticle image or a derivative thereof can serve as a substitute for the design layout in any embodiments described herein that use a design. The design may include any other design data or design data proxies described in commonly owned U.S. Pat. No. 7,570,796 issued on Aug. 4, 2009 to Zafar et al. and U.S. Pat. No. 7,676,077 issued on Mar. 9, 2010 to Kulkarni et al., both of which are incorporated by reference as if fully set forth herein. In addition, the design data can be standard cell library data, integrated layout data, design data for one or more layers, derivatives of the design data, and full or partial chip design data.

In general, however, the design information or data cannot be generated by imaging a wafer with a wafer inspection system. For example, the design patterns formed on the wafer may not accurately represent the design for the wafer and the wafer inspection system may not be capable of generating images of the design patterns formed on the wafer with sufficient resolution such that the images could be used to determine information about the design for the wafer. Therefore, in general, the design information or design data cannot be generated using a physical wafer. In addition, the "design" and "design data" described herein refers to information and data that is generated by semiconductor device designers in a design process and is therefore available for use in the embodiments described herein well in advance of printing of the design on any physical wafers.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a system configured to detect defects on a specimen. One embodiment of such a system is shown in FIG. 1. The system includes storage medium 100 configured for storing images for a specimen generated by inspection system 10. The inspection system is configured for scanning energy over a physical version of the specimen while detecting energy from the specimen to thereby generate the images for the specimen. The inspection system may also be configured to perform the scanning and the detecting with multiple modes.

In one embodiment, the specimen includes a wafer. The wafer may include any wafer known in the art.

In one embodiment, the energy scanned over the specimen includes light, and the energy detected from the specimen includes light. For example, in the embodiment of the system shown in FIG. 1, inspection system 10 includes an illumination subsystem configured to direct light to specimen 14. The illumination subsystem includes at least one light source. For example, as shown in FIG. 1, the illumination subsystem includes light source 16. In one embodiment, the illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to specimen 14 at an oblique angle of incidence. The oblique angle of incidence may include any suitable oblique angle of incidence, which may vary depending on, for instance, characteristics of the specimen and the defects to be detected on the specimen.

The illumination subsystem may be configured to direct the light to the specimen at different angles of incidence at different times. For example, the inspection system may be configured to alter one or more characteristics of one or more elements of the illumination subsystem such that the light can be directed to the specimen at an angle of incidence that is different than that shown in FIG. 1. In one such example, the inspection system may be configured to move light source 16, optical element 18, and lens 20 such that the light is directed to the specimen at a different oblique angle of incidence or a normal (or near normal) angle of incidence.

In some instances, the inspection system may be configured to direct light to the specimen at more than one angle of incidence at the same time. For example, the illumination subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, in some instances, optical element 18 may be configured as a spectral filter and the properties of the spectral filter can be changed in a variety of different ways (e.g., by swapping out the spectral filter) such that different wavelengths of light can be directed to the specimen at different times. The illumination subsystem may have any other suitable configuration known in the art for directing the light having different or the same characteristics to the specimen at different or the same angles of incidence sequentially or simultaneously.

In one embodiment, light source 16 may include a broadband plasma (BBP) light source. In this manner, the light generated by the light source and directed to the specimen may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused onto specimen 14 by lens 20. Although lens 20 is shown in FIG. 1 as a single refractive optical element, it is to be understood that, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the inspection system may be configured to alter one or more of the elements of the illumination subsystem based on the type of illumination to be used for inspection.

The inspection system may also include a scanning subsystem configured to cause the light to be scanned over the specimen. For example, the inspection system may include stage 22 on which specimen 14 is disposed during inspection. The scanning subsystem may include any suitable mechanical and/or robotic assembly (that includes stage 22) that can be configured to move the specimen such that the light can be scanned over the specimen. In addition, or alternatively, the inspection system may be configured such that one or more optical elements of the inspection system perform some scanning of the light over the specimen. The light may be scanned over the specimen in any suitable fashion such as in a serpentine-like path or in a spiral path.

The inspection system further includes one or more detection channels. At least one of the one or more detection channels includes a detector configured to detect light from the specimen due to illumination of the specimen by the system and to generate output responsive to the detected light. For example, the inspection system shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of light from the specimen (e.g., reflected light).

As further shown in FIG. 1, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 30, element 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 1 shows an embodiment of the inspection system that includes two detection channels, the inspection system may include a different number of detection channels (e.g., only one detection channel or two or more detection channels). In one such instance, the detection channel formed by collector 30, element 32, and detector 34 may form one side channel as described above, and the inspection system may include an additional detection channel (not shown) formed as another side channel that is positioned on the opposite side of the plane of incidence. Therefore, the inspection system may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the inspection system may also include two or more side channels configured as described above. As such, the inspection system may include at least three channels (i.e., one top channel and two side channels), and each of the at least three channels has its own collector, each of which is configured to collect light at different scattering angles than each of the other collectors.

As described further above, each of the detection channels included in the inspection system may be configured to detect scattered light. Therefore, the inspection system shown in FIG. 1 may be configured for dark field (DF) inspection of specimens. However, the inspection system may also or alternatively include detection channel(s) that are configured for bright field (BF) inspection of specimens. In other words, the inspection system may include at least one detection channel that is configured to detect light specularly reflected from the specimen. Therefore, the inspection systems described herein may be configured for only DF, only BF, or both DF and BF inspection. Although each of the collectors are shown in FIG. 1 as single refractive optical elements, it is to be understood that each of the collectors may include one or more refractive optical element(s) and/or one or more reflective optical element(s).

The one or more detection channels may include any suitable detectors known in the art. For example, the detectors may include photo-multiplier tubes (PMTs), charge coupled devices (CCDs), and time delay integration (TDI) cameras. The detectors may also include any other suitable detectors known in the art. The detectors may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the inspection system may be signals or data, but not image signals or image data. In such instances, a computer subsystem such as computer subsystem 36 of the inspection system may be configured to generate images of the specimen from the non-imaging output of the detectors. However, in other instances, the detectors may be configured as imaging detectors that are configured to generate imaging signals or image data. Therefore, the inspection system may be configured to generate the images described herein in a number of ways.

It is noted that FIG. 1 is provided herein to generally illustrate a configuration of an inspection system that may be included in the system embodiments described herein or that may generate images that are stored and used by the system embodiments described herein. Obviously, the inspection system configuration described herein may be altered to optimize the performance of the inspection system as is normally performed when designing a commercial inspection system. In addition, the systems described herein may be implemented using an existing inspection system (e.g., by adding functionality described herein to an existing inspection system) such as the 29xx/28xx series of tools that are commercially available from KLA-Tencor, Milpitas, Calif. For some such systems, the methods described herein may be provided as optional functionality of the inspection system (e.g., in addition to other functionality of the inspection system). Alternatively, the inspection system described herein may be designed "from scratch" to provide a completely new inspection system.

Computer subsystem 36 of the inspection system may be coupled to the detectors of the inspection system in any suitable manner (e.g., via one or more transmission media, which may include "wired" and/or "wireless" transmission media) such that the computer subsystem can receive the output generated by the detectors during scanning of the specimen. Computer subsystem 36 may be configured to perform a number of functions using the output of the detectors. For instance, the computer subsystem may be configured to detect defects on the specimen using the output of the detectors. Detecting the defects on the specimen may be performed by the computer subsystem by applying some defect detection algorithm and/or method to the output generated by the detectors. The defect detection algorithm and/or method may include any suitable algorithm and/or method known in the art. For example, the computer subsystem may compare the output of the detectors to a threshold. Any output having values above the threshold may be identified as a potential defect while any output having values below the threshold may not be identified as a potential defect. In another example, the computer subsystem may be configured to send the output of the detectors to a storage medium such as storage medium 100 without performing defect detection on the output. The computer subsystem of the inspection system may be further configured as described herein.

The computer subsystem of the inspection system (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems as described further herein. For example, computer subsystem 36 of the inspection system may be coupled to computer subsystem(s) 102 as shown by the dashed line in FIG. 1 by any suitable transmission media, which may include any suitable wired and/or wireless transmission media known in the art. Two or more of such computer subsystems may also be effectively coupled by a shared computer-readable storage medium (not shown) such as storage medium 100.

Although the system is described above as being an optical or light-based inspection system, the inspection system may be an electron beam-based system. In one such embodiment, the energy scanned over the specimen includes electrons, and the energy detected from the specimen includes electrons. In one such embodiment shown in FIG. 1a, the inspection system includes electron column 122 coupled to computer subsystem 124.

Figure 1A:
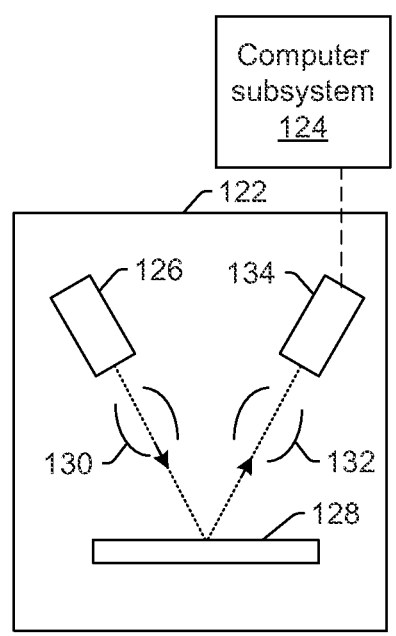

As also shown in FIG. 1a, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S.

Pat. No. 8,716,662 issued May 6, 2014 to MacDonald et al., which are incorporated by reference as if fully set forth herein.

Although the electron column is shown in FIG. 1a as being configured such that the electrons are directed to the specimen at an oblique angle of incidence and are scattered from the specimen at another oblique angle, it is to be understood that the electron beam may be directed to and scattered from the specimen at any suitable angles. In addition, the electron beam-based inspection system may be configured to use multiple modes to generate images of the specimen as described further herein (e.g., with different illumination angles, collection angles, etc.). The multiple modes of the electron beam-based inspection system may be different in any image generation parameters of the inspection system.

Computer subsystem 124 may be coupled to detector 134 as described above. The detector may detect electrons returned from the surface of the specimen thereby forming electron beam images of the specimen. The electron beam images may include any suitable electron beam images. Computer subsystem 124 may be configured to detect defects on the specimen using output generated by detector 134. Computer subsystem 124 may be configured to perform any additional step(s) described herein. A system that includes the inspection system shown in FIG. 1a may be further configured as described herein.

It is noted that FIG. 1a is provided herein to generally illustrate a configuration of an electron beam-based inspection system that may be included in the embodiments described herein. As with the optical inspection system described above, the electron beam-based inspection system configuration described herein may be altered to optimize the performance of the inspection system as is normally performed when designing a commercial inspection system. In addition, the systems described herein may be implemented using an existing inspection system (e.g., by adding functionality described herein to an existing inspection system) such as the eSxxx series of tools that are commercially available from KLA-Tencor, Milpitas, Calif. For some such systems, the methods described herein may be provided as optional functionality of the system (e.g., in addition to other functionality of the system). Alternatively, the system described herein may be designed "from scratch" to provide a completely new system.

As noted above, the inspection system is configured for scanning energy over a physical version of the specimen. In this manner, the inspection system may be configured as an "actual" inspection system, rather than a "virtual" inspection system. For example, storage medium 100 and computer subsystem(s) 102 shown in FIG. 1 may be configured as a "virtual" inspection system. In particular, the storage medium and the computer subsystem(s) are not part of inspection system 10 and do not have any capability for handling the physical version of the specimen. In other words, in inspection systems configured as virtual inspection systems, the output of its one or more "detectors" may be output that was previously generated by one or more detectors of an actual inspection system and that is stored in the virtual inspection system, and during the "scanning," the virtual inspection system may replay the stored output as though the specimen is being scanned. In this manner, scanning the specimen with a virtual inspection system may appear to be the same as though a physical specimen is being scanned with an actual inspection system, while, in reality, the "scanning" involves simply replaying output for the specimen in the same manner as the specimen may be scanned. Systems and methods configured as "virtual" inspection systems are described in commonly assigned U.S. Pat. No. 8,126,255 issued on Feb. 28, 2012 to Bhaskar et al. and U.S. Patent Application Publication No. 2014/0241610 by Duffy et al. published on Aug. 28, 2014, both of which are incorporated by reference as if fully set forth herein. The embodiments described herein may be further configured as described in this patent and patent application.

As further noted above, the inspection system may be configured to generate images of the specimen with multiple modes. In general, a "mode" can be defined by the values of parameters of the inspection system used for generating images of a specimen or the output used to generate images of the specimen. Therefore, modes that are different may be different in the values for at least one of the imaging parameters of the inspection system. For example, in one embodiment in which the energy scanned over the specimen and the energy detected from the specimen is light, at least one of the multiple modes uses at least one wavelength of the light scanned over the specimen that is different from at least one wavelength of the light scanned over the specimen used for at least one other of the multiple modes. The modes may be different in the wavelength scanned over the specimen as described further herein (e.g., by using different light sources, different spectral filters, etc.) for different modes. In another embodiment, at least one of the multiple modes uses an illumination channel of the inspection system that is different from an illumination channel of the inspection system used for at least one other of the multiple modes. For example, as noted above, the inspection system may include more than one illumination channel. As such, different illumination channels may be used for different modes.

In an additional embodiment, at least one of the multiple modes uses a configuration of an aperture of the inspection system that is different from a configuration of an aperture of the inspection system used for at least one other of the multiple modes. The aperture may be an illumination aperture (i.e., an aperture positioned in the path of the energy directed to the specimen) such as aperture 38 shown in FIG. 1 or a collection aperture (i.e., an aperture positioned in the path of the energy collected from the specimen) such as aperture 40 shown in FIG. 1. For example, if energy is directed to the specimen in different paths for different modes, then different apertures having at least one different characteristic (e.g., shape or size) may be positioned in the different paths. In another example, if energy is directed to the specimen in the same path for different modes, then different apertures having at least one different characteristic may be positioned in the path at different times to sequentially generate images for the specimen. In similar manners, the aperture in the path of energy from the specimen may be different for different modes by having different apertures having at least one different characteristic in the path of different energy from the specimen or by switching the aperture in the path of the energy between different scans with different modes.

As described above, therefore, the different modes may be different in illumination and/or collection/detection. The different modes may also or alternatively have other differences in collection/detection. For example, in one embodiment, at least one of the multiple modes uses a detection channel of the inspection system that is different from a detection channel of the inspection system used for at least one other of the multiple modes. In some such embodiments, as described further above, the inspection system may include multiple detection channels. Therefore, one of the detection channels may be used for one mode and another of the detection channels may be used for another mode. Furthermore, the modes may be different from each other in more than one way described herein (e.g., different modes may have one or more different illumination parameters and one or more different detection parameters).

The images stored by the storage medium include the images generated for locations on the specimen at which defects were not detected by the inspection system. In other words, unlike many inspection systems and methods that store only images for locations on the specimen at which defects or potential defects have been detected, the embodiments described herein preferably store all of the images that are generated for a specimen during inspection regardless of whether or not defects were detected in the images. In this manner, in some embodiments, the images stored by the storage medium include all of the images generated for the specimen by the inspection system during the scanning and detecting. In other words, the embodiments described herein may use stored, full specimen images generated with any modes.

In addition, unlike some methods and systems in which images for one or more (but no more than a few) discrete locations on a specimen (typically locations corresponding to defects of interest (DOIs)) are generated with multiple modes and then stored, the images that are stored by the embodiments described herein and used to perform various functions are images that have been generated by scanning a relatively large area on the specimen (i.e., as would be performed in a regular specimen inspection process after inspection recipe setup). In other words, the images stored by the storage medium preferably are images that are generated as the energy is scanned over a relatively large area on the specimen (e.g., an area on the specimen that is substantially larger than a single defect on the specimen and includes areas on the specimen that may and may not include defects). As such, the area on the specimen for which the images are generated and stored is an area having unknown defectivity. Furthermore, the scanning and detecting described herein that generates the images that are stored are not performed for the purposes of inspection recipe or process setup. In addition, the scanning and detecting described herein that generate the images that are stored are not performed at locations of known defects on the specimen, but are performed to determine if there are any defects present on the specimen.

After the images generated during scanning and detecting have been stored to the storage medium as described herein, all of the images that the computer subsystem(s) use to perform one or more of the functions described herein can be retrieved from the storage medium, which should eliminate any need to move the specimen back into the inspection system for additional image generation. For example, as described further herein, the computer subsystem(s) may perform several functions for a specimen or a defect that has been detected on a specimen. Therefore, by storing all of the images or other output that is generated during scanning and detecting without regard to whether defects were or were not detected in the images or other output means that after the scanning and detecting, the computer subsystems can access any of the images generated for the specimen. As such, unlike other systems and methods that may be currently available, the embodiments described herein do not need to collect point-by-point images or other data for each location on the specimen that has been determined to be of interest by reloading the specimen onto the inspector and repeating data collection with full rescans or point-by-point imaging. Either way, this would be substantially expensive (e.g., 5-10× more expensive than a virtual inspector depending on the virtual inspector configuration) relative to achieving this with persistent images of the specimen.

Figure 2:
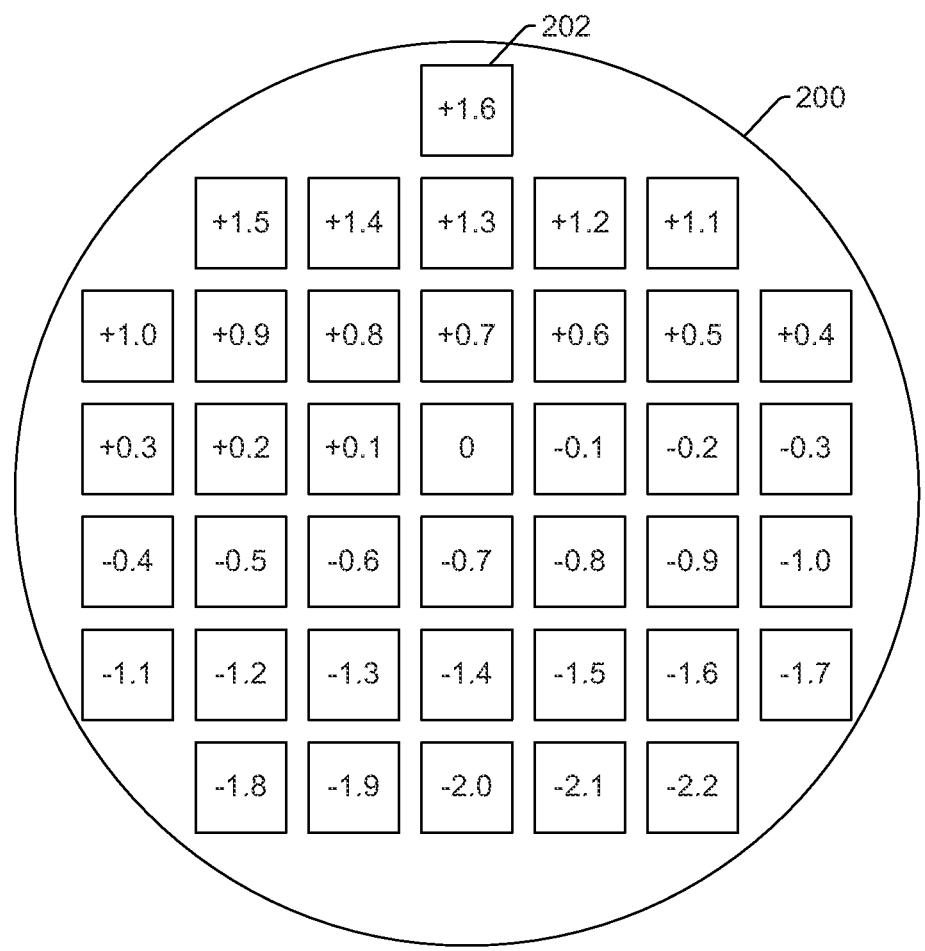
FIG. 2 is a schematic diagram illustrating a plan view of one embodiment of a specimen on which at least two dies are formed with different values of one or more parameters of a fabrication process performed on the specimen.

At least two dies are formed on the physical version of the specimen with different values of one or more parameters of a fabrication process performed on the specimen. For example, as shown in FIG. 2, specimen 200 in this embodiment is shown as a wafer. A number of dies 202 are formed on the wafer. In this example, different values for only one parameter of a fabrication process are shown. In particular, the different values shown in FIG. 2 are different values for focus of a lithography process. As further shown in FIG. 2, the values for focus may include both negative and positive values as well as 0 focus. In addition, although certain values for focus are shown in FIG. 2, the values for the focus may include any suitable values for any given combination of lithography process and wafer. The 0 focus value may be the nominal value for focus for a lithography process. However, a different focus value may be the nominal value for focus for a lithography process. The "nominal" value in general can be defined as the center of a process window and/or the best known focus value for a given fabrication process and specimen.

As further shown in FIG. 2, only one die is formed on the wafer for each different value of the focus parameter. In this manner, regardless of which die is formed at the nominal value of focus, no more than one die is formed on the wafer for the nominal value of focus. Having only one die formed at the nominal value of a parameter is possible since, as described further herein, the portions of the stored images that are compared are not constrained by locations of the dies on the specimen, locations of the patterns within the dies, or locations of the patterns on the specimen.

For example, in currently used methods and systems for process window qualification (PWQ), images, which are generated at locations on a specimen formed at different values of a parameter of a fabrication process, are compared to each other as the specimen is scanned since the images previously could not be stored for an indefinite period of time due to the storage and computing capacity of the inspection systems. Therefore, for each die that is formed at a modulated (or non-nominal) value of a parameter of the lithography process, at least one die neighboring each of those dies would have to be formed at a nominal value of the parameter of the lithography process such that the modulated and non-modulated dies could be scanned in the same swath and then images generated by such scanning could be compared while the specimen is being scanned. As such, a substantial number of dies would have to be formed on the specimen at the nominal values of the parameters being modulated. In particular, at least as many nominal dies as modulated dies would have to be formed on the specimen such that there are nominal dies neighboring each of the modulated dies.

In contrast, the comparisons that are performed by the embodiments described herein do not have to be performed while the specimen is being scanned since all of the images generated for the specimen during the scanning can be stored by the embodiments described herein and are therefore available for comparison after the scanning has been completed. As such, fewer nominal dies need to be formed on a specimen for the comparisons that are performed in a PWQ process. For example, since the images that are compared do not need to be compared while the specimen is being scanned, only one nominal die may be formed on a specimen, and the images generated for that nominal die can be stored and then compared to any other images generated for any other die formed on the specimen. Therefore, many more modulated dies may be formed on the specimen than was previously possible for PWQ methods.

Although the embodiment shown in FIG. 2 shows a wafer having dies formed thereon with different values of only one parameter of a fabrication process, the specimen may in some instances have dies formed thereon with different values of more than one parameter of the fabrication process. For example, in some instances, the values of one parameter may be different across the rows on the specimen while the values of another parameter may be different across the columns on the specimen. In one such example, the values for dose of a lithography process may vary from die-to-die in the columns on the specimen while the values for focus of the lithography process may vary from die-to-die in the rows on the specimen. In general, however, the dies having different values of more than one parameter on the specimen may have any suitable layout known in the art.

The system also includes one or more computer subsystems such as computer subsystem(s) 102 shown in FIG. 1 that are configured for comparing portions of the stored images generated at locations on the specimen at which patterns having the same as-designed characteristics are formed with at least two of the different values. The portions of the stored images that are compared are not constrained by locations of the dies on the specimen, locations of the patterns within the dies, or locations of the patterns on the specimen. For example, the embodiments described herein are configured to use mass image storage and computer infrastructure (e.g., a VI that is commercially available from KLA-Tencor) for offline PWQ and other functions described herein in a manner that relaxes the current spatial constraints of test and reference images on conventional defect inspectors. In addition, all of the functions of the embodiments described herein can be integrated into a software and hardware framework that includes components provided by KLA-Tencor (e.g., a VI) and alternative sources (e.g., an electronic design automation (EDA) tool).

In this manner, one instance of a pattern formed at one location on a specimen may be compared to another instance of the same as-designed pattern formed at any other location on the specimen regardless of whether the two instances of the pattern are formed at different locations in the same die on the wafer (i.e., different within die locations in the same die), different dies on the wafer, the same locations in different dies on the wafer (i.e., the same within-die locations in different dies), or different locations in different dies on the wafer (i.e., different within-die locations in different dies). Therefore, the embodiments described herein provide the maximum flexibility in the instances of the patterns whose portions of the images can be compared to each other. In other words, a portion of an image generated for any one instance of a pattern formed on a wafer can be compared to a portion of an image generated for any other instance of the pattern formed on the wafer. Comparing the portions of the stored images may otherwise be performed in any suitable manner. In addition, comparing the portions of the stored images may include comparing any one or more characteristics of the stored images to each other.

The patterns having the same as-designed characteristics are therefore patterns that have the same characteristics in the design or that are designed to have the same characteristics. However, patterns that have the same as-designed characteristics may or may not have the same characteristics on the specimen. For instance, since the patterns that are compared are designed to be the same but are formed with different values of at least one parameter of a fabrication process, the patterns that are compared may have different characteristics on the specimen. As described further herein, the embodiments can be used to identify such differences in the characteristics of the patterns. In addition, even patterns that are designed to be the same and are formed with the same values of all parameters of a fabrication process may have different characteristics as formed on the specimen. For example, variations in characteristics of the specimen as a function of position across the specimen may cause the same as-designed patterns to be formed differently on the specimen at different positions on the specimen. The embodiments described herein can also be used to identify such differences as described further herein.

The patterns having the same as-designed characteristics for which portions of the images are compared may include only one patterned feature in the design for the specimen or more than one patterned feature in the design. For example, each instance of the patterns may include a single patterned feature, or each instance of the patterns may include more than one patterned feature. The term "patterns" as used herein is also defined as only a substantially small percentage of the entire pattern included in a die. For example, the "patterns" may each include only around 0.001% of all patterns included in a die. In another example, the "patterns" may each include only one instance of about 100K pattern instances in a die, not all of which are the same patterns. Therefore, the area in a die or on the specimen across which a single instance of a pattern is formed may be substantially smaller than the entire area of the die or specimen.

The at least two of the different values corresponding to the portions of the images that are compared may include at least one nominal value. In other words, of the patterns corresponding to the portions of the images that are compared, at least one of the patterns may have been formed at a nominal value of the parameter(s). In this manner, the comparisons described herein may involve comparing a pattern fabricated at a modulated value of a parameter to a pattern fabricated at a nominal value of the parameter. However, in some instances, the comparisons described herein may involve comparing a pattern fabricated at one modulated value of a parameter to a pattern fabricated at a different modulated value of the parameter. In addition, the comparisons described herein may typically involve comparing portions of the images generated for only two instances of a pattern formed on a specimen (although that is not necessarily the case).

Figure 3:
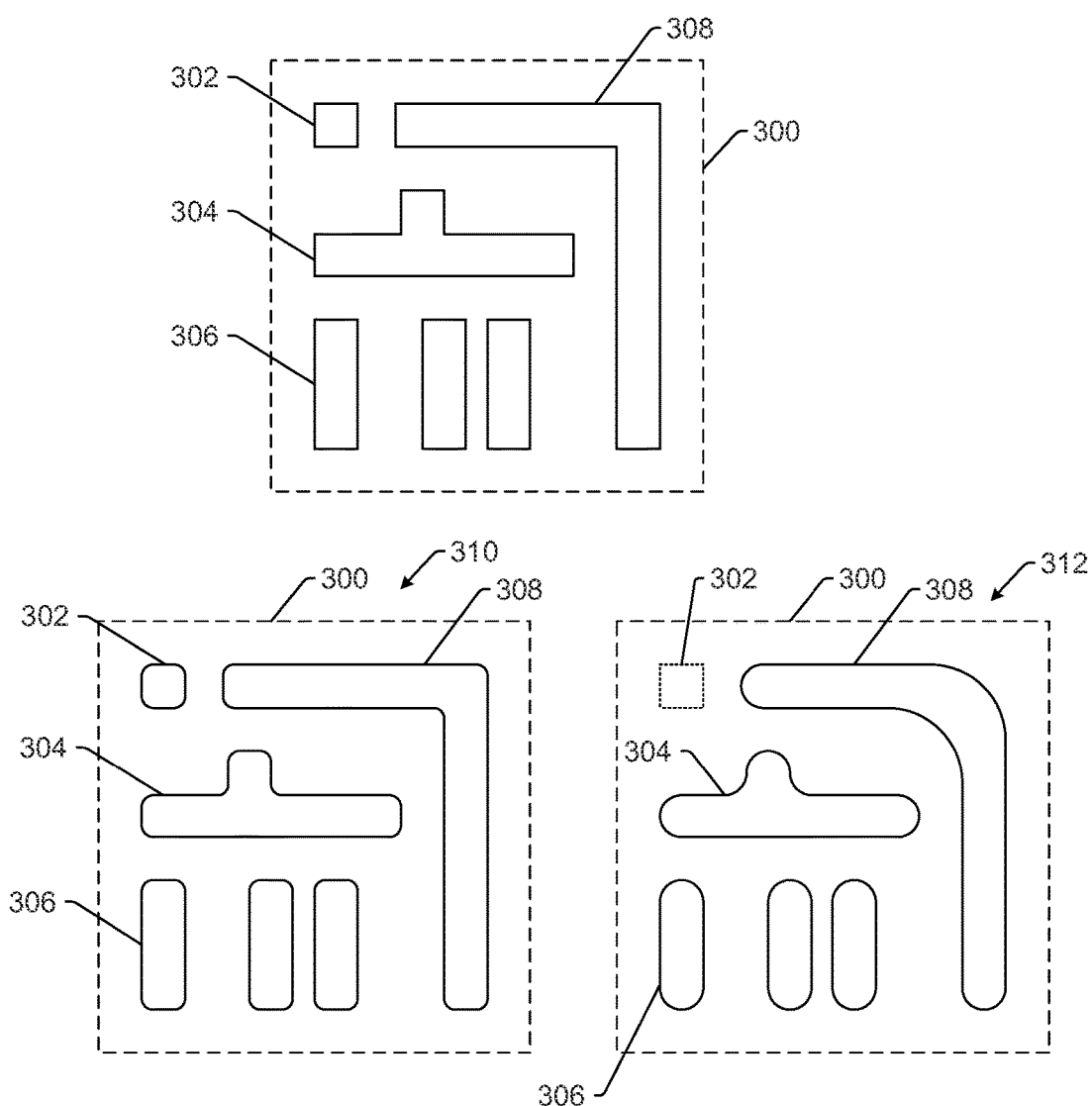
FIG. 3 is a schematic diagram illustrating a plan view of one example of patterns having the same as-designed characteristics in a design and formed on a specimen with at least two different values of one or more parameters of a fabrication process performed on the specimen.

FIG. 3 illustrates one example of a pattern in a design for a specimen and how that pattern may be formed on the specimen with different values of one or more parameters of a fabrication process. For example, pattern 300 illustrates how the patterned features in the pattern would appear in design data for the specimen. The patterned features include a number of different features including contact 302, polygon 304, lines 306, and polygon 308. The different feature types shown in FIG. 3 are only meant to illustrate some examples of feature types that may be included in a design for a specimen. The particular feature types for any given specimen will vary depending on the design for the specimen, which will vary depending on the function and other characteristics of the devices that are being formed on the specimen with the design. In addition, although the pattern is shown in FIG. 3 to include a particular number of patterned features, the pattern may include any suitable number of patterned features (i.e., one or more patterned features). In this manner, more than one patterned feature may be included in pattern 300 and therefore when the portions of the images are compared to each other for a pattern as described further herein, the portions of the images may include images of all of the patterned features included in the pattern (or at least as many of the patterned features that have been formed to some degree on the specimen).

As further shown in FIG. 3, different instances of the pattern may be formed on a specimen with different values of a parameter of a fabrication process, which may produce different characteristics of the pattern. For example, as shown in FIG. 3, instance 310 of pattern 300 may be formed on the specimen with a first value of a parameter of a fabrication process that is relatively close to nominal while instance 312 of pattern 300 may be formed on the specimen with a second value of the parameter of the fabrication process that is farther away from nominal than the first value. Therefore, instance 310 of the pattern may be formed on the specimen with characteristics that more closely resemble the as-designed characteristics of the pattern than instance 312 of the pattern. For example, as shown in instance 310, the corners of each of the patterned features included in the pattern are more rounded than they are in the design for the pattern. However, each of the patterned features included in the pattern are actually formed on the specimen in this instance of the pattern. In contrast, as shown in instance 312, the corners of each of the patterned features included in the pattern are much more rounded than they are in both the design for the pattern and in instance 310. In addition, not all of the patterned features included in the pattern are actually formed on the specimen in this instance of the pattern. For example, contact 302 in the design for the pattern does not appear in this instance of the pattern formed on the specimen as illustrated by the contact being shown in phantom in instance 312. Therefore, as the different instances of the pattern are formed on the specimen with values of the parameter of the fabrication process that are farther away from nominal, the pattern appears more different from the design for the pattern.

The computer subsystem(s) are further configured for detecting defects at the locations based on results of the comparing. Detecting the defects may be performed in any suitable manner such as by applying a defect detection method and/or algorithm to the results of the comparing. In one such example, the results of the comparing may be compared to a threshold, results of the comparing above the threshold may be identified as a defect or potential defect while results of the comparing below the threshold may not be identified as a defect or potential defect. Detecting the defects based on results of the comparing may include generating information such as locations at which defects or potential defects have been detected, possibly in combination with other information about the defects or potential defects.

In one embodiment, the computer subsystem(s) are configured for determining a process window for the fabrication process based on the detected defects. For example, the embodiments described herein may be used for automated process window characterization by leveraging persistent specimen imaging. In particular, the embodiments described herein may be used to help perform process window analysis. The embodiments described herein rely on unique features afforded by persistent images of a specimen or portions of a specimen. For example, the embodiments described herein can be implemented on currently available virtual inspection infrastructure that is commercially available from KLA-Tencor. Determining the process window for the fabrication process may include identifying which of the different values of the one or more parameters were used to print dies on the wafer in which defects or potential defects were detected. The process window may then be determined to include only those different values at which no defects or potential defects were detected. In this manner, if the process is operating inside of the determined process window, then the values of the one or more parameters used for the process should not cause any defects or potential defects to be formed on the specimen.

In another embodiment, the one or more computer subsystems are configured for determining which of the detected defects are systematic defects. For example, the embodiments described herein may be used for systematic defect detection by leveraging persistent specimen imaging. Determining which of the defects are systematic defects may include determining if defects are detected repeatedly in multiple instances of the to same patterns on the wafer. For example, if defects or potential defects are detected in multiple instances of a pattern on the wafer (regardless of whether the multiple instances are formed with the same values of the one or more parameters or different values of the one or more parameters), the fact that defects or potential defects are identified in the multiple instances may indicate that there is an issue in the compatibility of the process and design. In other words, such defects may indicate a design-process interaction issue. In contrast, if the design and process were compatible, then the defects or potential defects would appear in the same pattern randomly rather than repeatedly.

In some embodiments, the one or more computer subsystems are configured for identifying hot spots in a design for the specimen based on the detected defects. In this manner, the embodiments described herein can be used to identify hot spots (i.e., process/design incompatibilities). For example, the locations in the design at which systematic defects are identified as described above may be identified as hot spots in the design. The term "hot spots" is generally used in the art to refer to a portion of a design that is more susceptible to defects than other portions of the design. Therefore, once the locations of systematic defects have been identified, the locations in the design corresponding to the systematic defect locations may be identified as the hot spots. As described further herein, the embodiments rely on unique features provided by persistent images of a specimen or portions of a specimen and can be implemented on commercially available VI systems. The embodiments described herein enable improved probability of detection and potential productivity improvements. In addition, the embodiments described herein enable a comprehensive and automated procedure for hot spot discovery.

In a further embodiment, the computer subsystem(s) are configured for comparing the generated images, while the energy is being scanned over the physical version of the specimen and the energy is being detected from the specimen, generated at two of the locations, detecting additional defects based on results of comparing the generated images, and, for one of the additional defects, searching a design for the specimen for other locations of the patterns having the same as-designed characteristics as the patterns formed at the two of the locations. For example, in the embodiments described herein, the specimen may be inspected while the persistent image information is recorded at the same time. Once the additional defects are reported and systematic printing errors are identified, all occurrences of a specific printing error can be searched in the design space. The corresponding physical specimen locations can be used to probe (e.g., detect defects in) the pre-recorded stored images of many or all instances of a given pattern irrespective of location on the chip(s) selected. The design may be searched for other locations of the patterns in any suitable manner (e.g., by pattern matching). In addition, defects may be detected in the stored images corresponding to the locations identified by design search as described further herein.

In one such embodiment, the computer subsystem(s) are configured for determining one or more statistics for the patterns based on the stored images generated at the two of the locations and the other locations. For example, being able to probe the pre-recorded stored images for physical specimen locations corresponding to a defect detected on the specimen for many or all instances of a given pattern irrespective of locations on the chip(s) selected increases the statistics available for analysis. The statistics that are determined for the patterns may include any suitable statistics, and particularly those that are related to the formation of the patterns on the specimen (such as median, average, or standard deviation of a dimension of patterned features in multiple instances of a pattern formed on the wafer).

In another such embodiment, the computer subsystem(s) are configured for determining a severity of the one of the additional defects based on the stored images generated at the two of the locations and the other locations. For example, being able to probe the pre-recorded stored images for physical specimen locations corresponding to a defect detected on the specimen for many or all instances of a given pattern irrespective of locations on the chip(s) selected increases the statistics available for analysis and can be used to determine the severity of the printing error. For example, a defect that causes a substantial deviation in one or more characteristics of a pattern formed on a specimen compared to the one or more characteristics of the pattern in a design and in a substantial number of instances of the pattern formed on the specimen can be determined to be much more severe than a defect that has an impact on only a few instances of the pattern on the specimen (which may be the case for both dramatic deviations between patterns as formed on the wafer compared to patterns as included in a design and for less dramatic deviations). The severity of the defect may be expressed quantitatively, qualitatively, or in some other manner. For example, the severity of a defect may be expressed as a quantitative difference between the pattern as formed on the specimen compared to as-designed, by a qualitative expression such as very severe, less severe, not severe, etc., by a score or ranking of the severity of different defects compared to each other, and the like.

In an additional such embodiment, the computer subsystem(s) are configured for determining a process window for the fabrication process based on the stored images generated at the two of the locations and the other locations. For example, being able to probe the pre-recorded stored images for physical specimen locations corresponding to a defect detected on the specimen for many or all instances of a given pattern irrespective of locations on the chip(s) selected increases the statistics available for analysis and can be used to determine the severity of the printing error and at the same time to extract an estimate of the process window limit directly from stored images (optical or e-beam). The process window limit may be determined as described further herein.

In one embodiment, the computer subsystem(s) are configured for, based on the stored images, determining how different instances of the patterns having the same as-designed characteristics formed on the physical version of the specimen change as the different values of the one or more parameters used to form the different instances change. For example, the embodiments described herein can be used to monitor how a specific structure responds to changes in focus and exposure parameters. In one such example, catastrophic pattern failures due to interaction with neighboring structures (patterns bridging, collapsing, or shorting) are nonlinear effects induced in response to changes in lithography parameters. Stored images monitored at the same patterns but for to a progressive change in lithography conditions (e.g., focus) will show strong variation if a catastrophic failure is occurring. By identifying the corresponding portions of the stored images and their transition points (from non-defective to defective), it is possible to derive the process window limits for any structure. To complete the analysis, detected catastrophic failure can be visited under a scanning electron microscope (SEM) to refine the exact process window limit.

Figure 4:
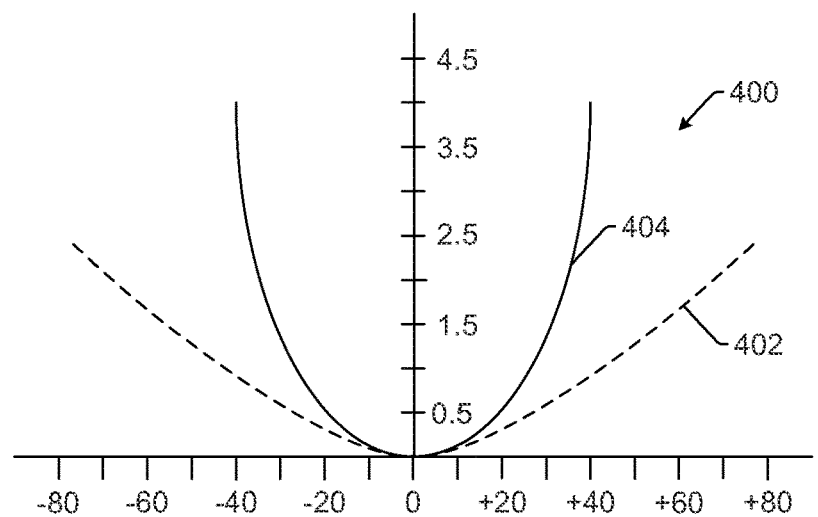
FIG. 4 is a plot illustrating one example of different responses of a characteristic of patterns to different values of one or more parameters of a fabrication process performed on a specimen.

FIG. 4 is a plot that illustrates a comparison of the response to changing lithography conditions for different patterns. For example, as shown in plot 400 of FIG. 4, the change in critical dimension (CD) as measured on a SEM or simulated is plotted on the y axis as a function of a parameter of a fabrication process on the x axis such as different focus conditions of a lithography process. The values shown on the x and y axes in FIG. 4 are not meant to be indicative of the actual changes in characteristics of patterns on any specific specimens or any actual parameters of any specific fabrication process that may be used for any specific specimens. In other words, the values shown on the x and y axes are completely hypothetical and are shown only to facilitate understanding of the embodiments described herein.

The data represented by curved line 402 in the plot illustrates the response to the changing parameters for a first pattern type (i.e., pattern type 1), and the data represented by curved line 404 in the plot illustrates the response to the changing parameters for a second pattern type (i.e., pattern type 2). As shown by the differences between the curved lines in the plot, pattern type 2 responds more dramatically to changes in the parameters than pattern type 1. Thus, pattern type 2 is less stable under varying process conditions than pattern type 1. Typically, quantifying these relative differences in behavior requires the use of a SEM or atomic force microscope (AFM). With the embodiments described herein, however, the relative behaviors of pattern types 1 and 2 are discernable with statistically based algorithms operating on a specimen scale image at optical inspector resolution. Persistent storage of the specimen images makes it practical to acquire substantially large samples for each pattern type irrespective of within-die and within-specimen location of the patterns.

In another embodiment, the computer subsystem(s) are configured for identifying the portions of the stored images by aligning a design for the specimen to the stored images. For example, to achieve accurate stored image probing such as that described further herein, it would be advantageous to correlate the structure of interest (pattern search in design space) with the exact recorded pixel(s). Accurate design-to-image registration (at the sub-pixel level) is therefore advantageous. In one such embodiment, identifying the portions of the stored images that correspond to locations of patterns having the same as-designed characteristics may be performed by aligning multiple images to a common reference such as a design. Aligning the images to a design for the specimen may be further performed as described in U.S. Pat. No. 7,676,077 to Kulkarni et al. issued on Mar. 9, 2010, U.S. Pat. No. 8,041,103 to Kulkarni et al. issued on Oct. 18, 2011, and U.S. Pat. No. 8,139,843 to Kulkarni et al. issued on Dec. 17, 2013, which are incorporated by reference as if fully set forth herein. The embodiments described herein may be further configured to perform any step(s) described in these patents and may be further configured as described in these patents.

In this manner, improvement in the coordinate accuracy for stored virtual inspection images, which enables the level of localization desired for advanced processes, may be achieved by extending the technologies used currently for registering images to design coordinates. In addition, the ability to precisely identify image data generated with different modes at the same specimen location may be aided by configuring the imaging and data handling of the system such that the input images (or the images generated by the detectors) meet substantially high coordinate precision (ideally identical pixel size and position in each image). In addition, the VI persistent mass image storage infrastructure approach that is commercially available from KLA-Tencor is well-designed to support this type of intensive off-line computation. However, although VI modules are particularly suitable for use in the embodiments described herein, other forms of mass image storage can be used as well. For example, the mass storage and related analysis can be implemented with a real inspector (i.e., one with physical specimen handling capability) or on a distributed storage and computer network.

In some embodiments, the physical version of the specimen includes a top layer and one or more underlying layers formed underneath the top layer, and the computer subsystem(s) are configured for aligning a design for the top layer of the specimen to one of the portions of the stored images corresponding to one of the defects and determining if the one of the defects is related to the top layer or the one or more underlying layers based on results of the aligning. For example, in some cases, the systematic defects being detected correspond to optical artifacts not related to the layer being investigated (e.g., previous layers). To filter out those situations, the signal (e.g., defect—reference) may be first overlaid with the design to make sure that the observed signal is the result of an interaction between the layout and the process (e.g., signal observed in an open area can be disregarded, etc.). In some instances, determining if a defect is located on or corresponds to one layer of a specimen may be performed by comparing the stored images corresponding to the defect location to the design for that one layer. However, in additional instances, it may be advantageous to compare the stored images corresponding to the defect location to the design for other layers as well. For example, if a comparison of the defect to the design for the top layer shows that there is no correlation between the patterned features of the design for the top layer and the defect, the stored images for the defect location may be compared to the design for a different layer (e.g., one of the underlying layers) to determine if there is a correlation between the patterned features of the design for the other layer and the defect. In this manner, the defect may be determined to be associated with (e.g., caused by) an interaction between the design for a layer other than the layer being inspected and the process used to form the layer being inspected. However, in other instances, the defects determined to not correspond to (be located on or in, etc.) the layer being inspected may simply be discarded as non-interesting or nuisance defects for the inspection being performed.

In another embodiment, the computer subsystem(s) are configured for determining a relationship between one or more characteristics of hypothetical images generated for the physical version of the specimen by the inspection system and one or more characteristics of the patterns formed on the physical version of the specimen, determining the one or more characteristics of one or more of the portions of the stored images or one or more additional portions of the stored images, and identifying one or more pattern failure modes on the physical version of the specimen by inputting the one or more determined characteristics of the one or more of the portions of the stored images or the one or more additional portions of the stored images into the relationship and comparing output of the relationship to as-designed characteristics of the patterns. For example, non-catastrophic pattern failure modes (e.g., pattern changes above a specified percentage deviation in CD), for example, excessive line end pull back near a contact interconnection or excessive corner rounding, may need to be considered separately. In this case, a calibration between measured signal and possible CD variation may be estimated a priori or calculated dynamically (e.g., through process simulation) based on design content at the image location. In this manner, based on the known relationship between pattern characteristics on a physical version of the specimen and characteristics of images that would be generated for the different pattern characteristics, characteristics of the stored images may be input to the relationship to determine the characteristics of the patterns formed on the specimen.

In a further embodiment, the locations on the specimen for which the portions of the stored images are compared include locations in the same reticle field printed on the specimen. For example, the embodiments described herein can be used to detect cases where pattern instances that are intended to be identical on a specimen but for various reasons (e.g., optical proximity correction (OPC) variations or mask errors) are printing differently (even within a given printed reticle field) but may not vary above the specified limit when comparison is done from die-to-die (modulation-to-modulation). In other words, in general, all of the location within the same reticle field on a wafer will typically be printed with the same values of parameters of a lithography process. Therefore, if the same reticle field includes multiple instances of the same as-designed pattern, stored images corresponding to the locations of the multiple instances of the pattern may be compared to each other as described further herein and the results of the comparisons may be used as described further herein to detect defects in one or more of the multiple instances. The same type of comparing and detecting may also be performed for instances of a given pattern that may not be formed in the same reticle field but are formed at the same values of all parameters of the fabrication process.

In an additional embodiment, the computer subsystem(s) are configured for comparing additional portions of the stored images generated at additional locations on the specimen at which patterns having the same as-designed characteristics are formed with the same values of the one or more parameters of the fabrication process and detecting defects at the additional locations based on results of comparing the additional portions. For example, the embodiments described herein can be applied to monitor primitive structures existing in the design (typically only 100K different primitives having a size of about 200 nm by 200 nm exist in a logic design). In this case, the recipe tuning and preparation can be skipped completely and only the stored images for the specimen are needed. In addition, the embodiments described herein can be used for probing the stored images from structures intended to be identical without regard to their location within a reticle field and without depending on conventional defect detection thresholding to identify unintended pattern differences due to process or mask variations. In this manner, the embodiments described herein can be used to monitor each primitive structure (which in combination make up the entire design for the specimen) independently across modulations and "fragile" primitives (i.e., primitives that are more susceptible to defects due to changes in process conditions than other primitives) can be identified by statistical analysis. Comparing the additional portions may otherwise be performed as described herein with respect to comparing the portions. Likewise, detecting the defects at the additional locations may be performed as described herein with respect to detecting the defects at the locations.

In some embodiments, the comparing and detecting are separately performed for each of the patterns having different as-designed characteristics formed on the specimen. For example, multiple, different primitive structures can be sequentially monitored as described above. In other words, a first primitive structure may be examined by performing the comparing and detecting steps described herein for two or more instances of the first primitive structure, then a second primitive structure, different than the first, may be examined by performing the comparing and detecting steps described herein for two or more instances of the second primitive structure, and so on.

In another embodiment, the patterns are included in a set of patterns whose printability on the specimen is uncertain, and the comparing and detecting are separately performed for one or more additional patterns included in the set. For example, the functions that can be performed by the embodiments described herein can be applied to a list of "uncertain" structures identified by simulation or generated by applying design rule checking (DRC) considerations. In this manner, because the list of primitive structures in any given design can be extensive, examining each and every primitive structure in a design can be prohibitive. Geometrical-based analysis performed in design space (e.g., DRC) can be used to identify primitives that are "challenging" to print successfully for patterning modules (e.g., due to their substantially small dimensions). Therefore, rather than performing the analysis described herein for every single primitive in a design, the analysis can focus on (be performed for only) the uncertain or challenging primitives.

In an additional embodiment, the stored images are generated using two or more optical modes of the inspection system, the portions of the stored images that are compared include portions of the stored images generated using only one of the two or more optical modes, and the comparing and detecting are separately performed for portions of the stored images generated at the locations on the specimen with only another of the two or more optical modes. For example, the source of the images used to probe the different structures can be a single specimen image or multiple specimen images (e.g., different optical or e-beam modes may be used to increase detection probability). The mass image storage and computer infrastructure described herein enables the ability to record the same specimen using different and complementary optical or e-beam settings. However, comparing images to each other that are generated with different modes can generate results that are not necessarily indicative of differences in printing of different instances of the same pattern with different or the same values of the parameters of the fabrication process. Instead, the differences between the images generated by such comparing may be simply indicative of the differences in the multiple modes used to generate the images. Therefore, any images that are compared may have been generated using the same mode. As such, different comparing and detecting steps may be separately performed for different modes. The results of such steps performed for different modes may, however, be used collectively to determine information about how the design is being printed on the wafer at the same or different values of the parameters of the fabrication process. For example, the defect detection results produced using images generated with different modes of an inspection system may be used in combination to determine information about the defects detected in any one mode.

In a further embodiment, the computer subsystem(s) are configured for determining one or more parameters for defect sampling based on a complete distribution of a characteristic of portions of the stored images generated at locations on the specimen at which patterns having the same as-designed characteristics are formed with the same values of the one or more parameters. For example, the embodiments described herein may be used for determining criteria for defect sampling based on observations obtained by analyzing the complete distribution of the signal collected on a relatively large number of pattern instances intended to be identical, not only from a discrete die-to-die comparison event as in the currently used inspection approach. In one such example, based on the complete distribution described above, the criteria for sampling may be determined such that defects or locations having certain values of the characteristic within the distribution are selected for defect review, such that defects or locations having certain types of the distribution are sampled more or less heavily, etc. In this manner, a substantial amount of information for a defect or location (e.g., information determined based on the image generated and stored for every instance of that defect or location) can be used to set the criteria for defect sampling for review, which can improve the quality of the information generated by defect review and its usefulness for altering the fabrication process and/or design to improve fabrication of the device on the specimen.

In some embodiments, the computer subsystem(s) are configured for grouping the detected defects based on the as-designed characteristics of the patterns in which the detected defects are located to thereby group the detected defects located in the patterns having the same as-designed characteristics into the same group and the detected defects located in the patterns having different as-designed characteristics into different groups and identifying patterns of interest (POIs) on the specimen based on results of the grouping. For example, the images for a specimen may be recorded as described herein using mass image storage and computer infrastructure (e.g., a VI) and then a list of the detected defects may be processed using a design-intent based grouping algorithm and/or method to identify the set of POIs for the specimen. The design-based grouping algorithm and/or method may include any suitable such grouping algorithm and/or method such as those described in U.S. Pat. No. 7,570,796 issued on Aug. 4, 2009 to Zafar et al. and U.S. Pat. No. 8,923,600 issued on Dec. 30, 2014 to Zafar et al. and U.S. Patent Application Publication No. 2015/0154746 published on Jun. 4, 2015 to Zafar et al., all of which are incorporated by reference as if fully set forth herein. The embodiments described herein may include any step(s) of any method(s) described in these patents and this publication and may be further configured as described in these patents and this publication.

Figure 5:
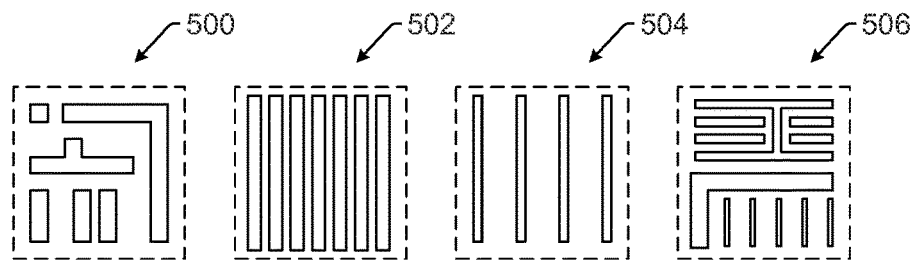
FIG. 5 is a schematic diagram illustrating a plan view of different examples of patterns having different as-designed characteristics that can be separated into different groups by the embodiments described herein.

In this manner, each of the different groups may correspond to only one pattern in the design. For example, as shown in FIG. 5, grouping the detected defects based on the as-designed characteristics of the patterns may produce four different groups. Although four groups are shown in FIG. 5, obviously, the number of different groups may vary depending on the number of different as-designed characteristics of the patterns in which the detected defects are located. As shown in FIG. 5, group 500 includes defects (not shown in FIG. 5) located in patterns having a first set of as-designed characteristics. In addition, group 502 includes defects (not shown in FIG. 5) located in patterns having a second set of as-designed characteristics. Group 504 includes defects (not shown in FIG. 5) located in patterns having a third set of as-designed characteristics, while group 506 includes defects (not shown in FIG. 5) located in patterns having a fourth set of as-designed characteristics. The first, second, third, and fourth set of as-designed characteristics are each different from each other set of as-designed characteristics. In particular, as shown in FIG. 5, the patterns corresponding to each of the different groups are different from the patterns corresponding to each of the other groups. In addition, within each group, the as-designed characteristics of the patterns in which the defects in each group are located are the same. For example, for each defect that is grouped into group 500, the as-designed characteristics of the patterns in which each defect is located are the same as every other defect that is grouped into that group.

The POIs may be identified based on the results of the grouping in any suitable manner. For example, groups that contain a significant number of defects or instances of a pattern indicate that that pattern exhibits significant defectivity on the specimen. In other words, the number of instances of a pattern that are included in a group will be equal to the number of instances that a defect was detected in that pattern. Therefore, patterns that correspond to groups that contain a higher number of instances of the patterns may be identified as POIs since they may be of greater interest to the fabrication of the device being formed on the specimen compared to other patterns in the design. In particular, since those patterns may cause a greater number of defects on the specimen compared to other patterns, those more defective patterns may be indicated as POIs. Information about the POIs may then be used to alter one or more parameters of a process performed for the design being formed on the specimen or for the specimen itself. For example, information about the locations of the POIs within the dies being formed on the wafer or within the wafer itself may be used to alter a defect review process to be performed on the specimen such that a greater number of the POIs compared to other patterns in the design can be reviewed during defect review to thereby determine more information about the defects being detected in the POIs compared to defects detected in other patterns in the design.

In one such embodiment, the computer subsystem(s) are configured for identifying every instance of the POIs in a design for the specimen. For example, an exhaustive list of instances for each POI may be generated using a design search utility. Searching the design for instances of the POIs may be performed as described further herein.

The embodiments described herein provide a number of advantages over other currently used methods and systems for detecting defects on a specimen. For example, the embodiments described herein rely on offline computation using a VI and do not require multiple iterations involving inspection and review tools. In addition, the procedure can be fully automated and any number of printing errors can be probed and monitored. Furthermore, only critical hot spots identified with their approximated process window limits may be sent for SEM review confirmation and fine process window setting.

Optical inspection has a relatively large and fast coverage capability but relatively low resolution (e.g., compared to a SEM). The embodiments described herein are also advantageous in that they enable optical inspection manufacturers to extend the capability of their optical inspection platforms to areas of metrology-like inspection operations. The embodiments described herein can be implemented using commercially available mass image storage and computer infrastructure such as a VI commercially available from KLA-Tencor. The ability to analyze collectively the response of a relatively large number of identical structures (i.e., a relatively large sampling set) to process variation using optical information is generic and can be valuable in different contexts (e.g., process optimization, design of experiments, etc.).

Each of the embodiments of the system described above may be combined together into one single embodiment.

Another embodiment relates to a method for detecting defects on a specimen. The method includes storing images for a specimen generated by an inspection system. The inspection system is configured as described herein. At least two dies are formed on the physical version of the specimen with different values of one or more parameters of a fabrication process performed on the specimen. The dies may be formed on the specimen as described further herein. The method also includes comparing portions of the stored images generated at locations on the specimen at which patterns having the same as-designed characteristics are formed with at least two of the different values. The portions of the stored images that are compared are not constrained by locations of the dies on the specimen, locations of the patterns within the dies, or locations of the patterns on the specimen. The method also includes detecting defects at the locations based on results of the comparing.

Each of the steps of the method may be performed as described further herein. The method may also include any other step(s) that can be performed by the inspection system and/or computer subsystem(s) described herein. The storing, comparing, and detecting steps are performed by one or more computer subsystems, which may be configured according to any of the embodiments described herein. In addition, the method described above may be performed by any of the system embodiments described herein.

Figure 6:
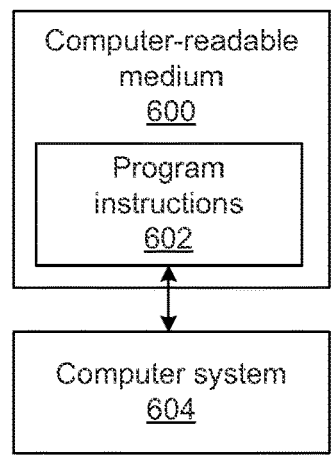
FIG. 6 is a block diagram illustrating one embodiment of a non-transitory computer-readable medium storing program instructions for causing a computer system to perform a computer-implemented method described herein.

An additional embodiment relates to a non-transitory computer-readable medium storing program instructions executable on a computer system for performing a computer-implemented method for detecting defects on a specimen. One such embodiment is shown in FIG. 6. In particular, as shown in FIG. 6, non-transitory computer-readable medium 600 includes program instructions 602 executable on computer system 604. The computer-implemented method may include any step(s) of any method(s) described herein.

Program instructions 602 implementing methods such as those described herein may be stored on computer-readable medium 600. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system 604 may be configured according to any of the embodiments described herein.

Further modifications and alternative embodiments of various aspects of the invention will be apparent to those skilled in the art in view of this description. For example, methods and systems for detecting defects on a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to detect defects on a specimen, comprising:
    an inspection system configured for scanning energy over a physical version of a specimen while detecting energy from the specimen to thereby generate images for the specimen, wherein the inspection system generates the images for the specimen with two or more modes defined by values of parameters of the inspection system used for generating the images for the specimen, wherein the inspection system comprises an illumination subsystem configured to direct the energy to the specimen, a scanning subsystem configured to cause the energy to be scanned over the specimen, and one or more detection channels comprising a detector configured to detect the energy from the specimen, wherein the two or more modes have one or more different parameters of the illumination subsystem, one or more different parameters of the one or more detection channels, or a combination thereof, and wherein at least two dies are formed on the physical version of the specimen with different values of one or more parameters of a fabrication process performed on the specimen;
    a storage medium configured for storing the images for the specimen generated by the inspection system, wherein the stored images are generated using the two or more modes of the inspection system; and
    one or more computer subsystems configured for:
        comparing portions of the stored images generated at locations on the specimen at which patterns having the same as-designed characteristics are formed with at least two of the different values of the one or more parameters of the fabrication process, wherein the portions of the stored images that are compared are not constrained by locations of the dies on the specimen, locations of the patterns within the dies, or locations of the patterns on the specimen, and wherein the portions of the stored images that are compared comprise the portions of the stored images generated using only one of the two or more modes; and
        detecting defects at the locations based on results of said comparing, wherein said comparing and said detecting are separately performed for the portions of the stored images generated at the locations on the specimen with only another of the two or more modes.

2. The system of claim 1, wherein the storage medium and the one or more computer subsystems are not part of the inspection system and do not have any capability for handling the physical version of the specimen.

3. The system of claim 1, wherein the storage medium and the one or more computer subsystems are further configured as a virtual inspection system.

4. The system of claim 1, wherein the images stored by the storage medium comprise all of the images generated for the specimen by the inspection system during the scanning and the detecting.

5. The system of claim 1, wherein the one or more computer subsystems are further configured for determining a process window tor the fabrication process based on the detected defects.

6. The system of claim 1, wherein the one or more computer subsystems are further configured for determining which of the detected defects are systematic defects.

7. The system of claim 1, wherein the one or more computer subsystems are further configured for identifying hot spots in a design for the specimen based on the detected defects.

8. The system of claim 1, wherein the one or more computer subsystems are further configured for comparing the generated images, while the energy is being scanned over the physical version of the specimen and the energy is being detected from the specimen, generated at two of the locations, detecting additional defects based on results of comparing the generated images, and, for one of the additional defects, searching a design for the specimen for other locations of the patterns having the same as-designed characteristics as the patterns formed at the two of the locations.

9. The system of claim 8, wherein the one or more computer subsystems are further configured for determining one or more statistics for the patterns based on the stored images generated at the two of the locations and the other locations.

10. The system of claim 8, wherein the one or more computer subsystems are further configured for determining a severity of the one of the additional defects based on the stored images generated at the two of the locations and the other locations.

11. The system of claim 8, wherein the one or more computer subsystems are further configured for determining a process window for the fabrication process based on the stored images generated at the two of the locations and the other locations.

12. The system of claim 1, wherein the one or more computer subsystems are further configured for, based on the stored images, determining how different instances of the patterns having the same as-designed characteristics formed on the physical version of the specimen change as the different values of the one or more parameters used to form the different instances change.

13. The system of claim 1, wherein the one or more computer subsystems are further configured for identifying the portions of the stored images by aligning a design for the specimen to the stored images.

14. The system of claim 1, wherein the physical version of the specimen comprises a top layer and one or more underlying layers formed underneath the top layer, and wherein the one or more computer subsystems are further configured for aligning a design for the top layer of the specimen to one of the portions of the stored images corresponding to one of the defects and determining if the one of the defects is related to the top layer or the one or more underlying layers based on results of said aligning.

15. The system of claim 1, wherein the one or more computer subsystems are further configured for determining a relationship between one or more characteristics of hypothetical images generated for the physical version of the specimen by the inspection system and one or more characteristics of the patterns formed on the physical version of the specimen, determining the one or more characteristics of one or more of the portions of the stored images or one or more additional portions of the stored images, and identifying one or more pattern failure modes on the physical version of the specimen by inputting the one or more determined characteristics of the one or more of the portions of the stored images or the one or more additional portions of the stored images into the relationship and comparing output of the relationship to as-designed characteristics of the patterns.

16. The system of claim 1, wherein the locations on the specimen for which the portions of the stored images are compared comprise locations in the same reticle field printed on the specimen.

17. The system of claim 1, wherein the one or more computer subsystems are further configured for comparing additional portions of the stored images generated at additional locations on the specimen at which patterns having the same as-designed characteristics are formed with the same values of the one or more parameters of the fabrication process and detecting defects at the additional locations based on results of comparing the additional portions.

18. The system of claim 1, wherein said comparing and said detecting are further separately performed for each of the patterns having different as-designed characteristics formed on the specimen.

19. The system of claim 1, wherein the patterns are included in a set of patterns whose printability on the specimen is uncertain, and wherein said comparing and said detecting are further separately performed for one or more additional patterns included in the set.

20. The system of claim 1, wherein the one or more computer subsystems are further configured for determining one or more parameters for defect sampling based on a complete distribution of a characteristic of portions of the stored images generated at locations on the specimen at which patterns having the same as-designed characteristics are formed with the same values of the one or more parameters.

21. The system of claim 1, wherein the one or more computer subsystems are further configured for grouping the detected defects based on the as-designed characteristics of the patterns in which the detected defects are located to thereby group the detected defects located in the patterns having the same as-designed characteristics into the same group and the detected defects located in the patterns having different as-designed characteristics into different groups and identifying patterns of interest on the specimen based on results of said grouping.

22. The system of claim 21, wherein the one or more computer subsystems are further configured for identifying every instance of the patterns of interest in a design for the specimen.

23. The system of claim 1, wherein the specimen comprises a wafer.

24. The system of claim 1, wherein the energy scanned over the specimen comprises light, and wherein the energy detected from the specimen comprises light.

25. The system of claim 1, wherein the energy scanned over the specimen comprises electrons, and wherein the energy detected from the specimen comprises electrons.

26. A non-transitory computer-readable medium, storing program instructions executable on a computer system for performing a computer-implemented method for detecting defects on a specimen, wherein the computer-implemented method comprises:

generating images for a physical version of a specimen with an inspection system by scanning energy over the physical version of the specimen while detecting energy from the specimen to thereby generate the images for the specimen, wherein the inspection system generates the images for the specimen with two or more modes defined by values of parameters of the inspection system used for generating the images for the specimen, wherein the inspection system comprises an illumination subsystem configured to direct the energy to the specimen, a scanning subsystem configured to cause the energy to be scanned over the specimen, and one or more detection channels comprising a detector configured to detect the energy from the specimen, wherein the two or more modes have one or more different parameters of the illumination subsystem, one or more different parameters of the one or more detection channels, or a combination thereof, and wherein at least two dies are formed on the physical version of the specimen with different values of one or more parameters of a fabrication process performed on the specimen;

storing the images for the specimen generated by the inspection system with a storage medium, wherein the stored images are generated using the two or more modes of the inspection system;

comparing portions of the stored images generated at locations on the specimen at which patterns having the same as-designed characteristics are formed with at least two of the different values of the one or more parameters of the fabrication process, wherein the portions of the stored images that are compared are not constrained by locations of the dies on the specimen, locations of the patterns within the dies, or locations of the patterns on the specimen, and wherein the portions of the stored images that are compared comprise the portions of the stored images generated using only one of the two or more modes; and detecting defects at the locations based on results of said comparing, wherein said comparing and said detecting are separately performed for the portions of the stored images generated at the locations on the specimen with only another of the two or more modes.

27. A method for detecting defects on a specimen, comprising:

generating images for a physical version of a specimen with an inspection system by scanning energy over the physical version of the specimen while detecting energy from the specimen to thereby generate the images for the specimen, wherein the inspection system generates the images for the specimen with two or more modes defined by values of parameters of the inspection system used for generating the images for the specimen, wherein the inspection system comprises an illumination subsystem configured to direct the energy to the specimen, a scanning subsystem configured to cause the energy to be scanned over the specimen, and one or more detection channels comprising a detector configured to detect the energy from the specimen, wherein the two or more modes have one or more different parameters of the illumination subsystem, one or more different parameters of the one or more detection channels, or a combination thereof, and wherein at least two dies are formed on the physical version of the specimen with different values of one or more parameters of a fabrication process performed on the specimen;

storing the images for the specimen generated by the inspection system with a storage medium, wherein the stored images are generated using the two or more modes of the inspection system;

comparing portions of the stored images generated at locations on the specimen at which patterns having the same as-designed characteristics are formed with at least two of the different values of the one or more parameters of the fabrication process, wherein the portions of the stored images that are compared are not constrained by locations of the dies on the specimen, locations of the patterns within the dies, or locations of the patterns on the specimen, and wherein the portions of the stored images that are compared comprise the portions of the stored images generated using only one of the two or more modes; and detecting defects at the locations based on results of said comparing, wherein said comparing and said detecting are separately performed for the portions of the stored images generated at the locations on the specimen with only another of the two or more modes, and wherein said comparing and said detecting are performed by a computer system.

* * * * *